(12) United States Patent
Mecklenburg et al.

(10) Patent No.: US 9,592,838 B1
(45) Date of Patent: Mar. 14, 2017

(54) TANDEM RAIL RIDER AND METHOD OF USE THEREOF

(71) Applicants: Chiprle Mae Mecklenburg, Tupper Lake, NY (US); Daniel Carl Mecklenburg, Sr., Tupper Lake, NY (US)

(72) Inventors: Chiprle Mae Mecklenburg, Tupper Lake, NY (US); Daniel Carl Mecklenburg, Sr., Tupper Lake, NY (US)

( * ) Notice: Subject to any disclaimer, the term of this patent is extended or adjusted under 35 U.S.C. 154(b) by 0 days.

(21) Appl. No.: 15/201,652

(22) Filed: Jul. 5, 2016

(51) Int. Cl.
*B61D 15/10* (2006.01)
*B62K 13/06* (2006.01)
*B62K 13/02* (2006.01)

(52) U.S. Cl.
CPC .............. *B61D 15/10* (2013.01); *B62K 13/02* (2013.01); *B62K 13/025* (2013.01); *B62K 13/06* (2013.01)

(58) Field of Classification Search
CPC ................................ B62K 13/06; B61D 15/10
USPC .............................. 280/209, 282; 105/95, 91
See application file for complete search history.

(56) References Cited

U.S. PATENT DOCUMENTS

| | | | |
|---|---|---|---|
| 28,153 A | 5/1860 | Busser | |
| 150,146 A | 4/1874 | Fowler | |
| 510,924 A * | 12/1893 | Moore | B61D 15/10 105/95 |
| 551,623 A | 12/1895 | Donavan | |
| 822,688 A * | 6/1906 | Nicholas | B62K 13/06 280/209 |
| 1,170,148 A * | 2/1916 | Grogan | B62K 13/06 280/203 |
| 1,254,434 A * | 1/1918 | Rea | B61D 15/10 105/95 |
| 1,436,532 A * | 11/1922 | Revny | B61D 15/10 105/95 |

(Continued)

FOREIGN PATENT DOCUMENTS

DE        102012017285 A1 *  3/2014  ............. B61D 15/10

OTHER PUBLICATIONS

Sears, Roebuck & Co., Catalogue III., 1902 Edition (ISBN 0-517-00922-6) p. 284, col. 1 (Our Railroad Attachment).

*Primary Examiner* — Ruth Ilan (57) ABSTRACT

A tandem rider device and method of use for maintaining three planes of stability, elimination of interference and steering is presented. In particular, the present invention relates to devices and mechanisms, which when connected to the three planes of stability, vertical, horizontal and axial, between two duplicate personal transportation devices or between the transportation device and another device including structural stability elements provide for the following three enhancements. Provide tracking wheels, levers, springs and pedals for interference elimination devices allowing removal of tracking wheel interferences when two devices are connected together. Providing steering mechanism used for steering two duplicate personal transportation devices or steering the transportation device and another device when the tandem rider device is placed on a suitable surface other than parallel tracks. Providing a plurality of assemblies, that when such assemblies are removed, allow engagement of the steering mechanism when the transportation devices are removed from parallel tracks.

12 Claims, 12 Drawing Sheets

(56) References Cited

U.S. PATENT DOCUMENTS

| | | | |
|---|---|---|---|
| 1,522,039 A * | 1/1925 | Swearinger | B62K 13/06 |
| | | | 280/209 |
| 2,787,970 A | 4/1957 | Bennett | |
| 3,130,686 A | 4/1964 | Fiechter et al. | |
| 3,144,837 A | 8/1964 | Patton | |
| 3,424,106 A | 1/1969 | Scroggs et al. | |
| 3,865,401 A * | 2/1975 | Kingsly | B62K 13/06 |
| | | | 280/209 |
| 4,153,312 A | 5/1979 | Taniwaki | |
| 4,213,397 A | 7/1980 | Matte | |
| 4,230,046 A | 10/1980 | Smart | |
| 5,461,984 A | 10/1995 | Andress, III | |
| 6,666,468 B2 * | 12/2003 | McCandless | B62K 13/06 |
| | | | 280/209 |
| 7,861,658 B2 | 1/2011 | Lee | |
| 7,895,951 B1 | 3/2011 | McGrath, Jr. | |

\* cited by examiner

TANDEM RAIL RIDER AND METHOD OF USE THEREOF

RELATED APPLICATION

Since the late 1800's patents have been issued to inventors who have been inventing ways to ride on railroad tracks using various methods of allowing a bicycle or other conveyance to follow the railroad tracks. Relative to CCL/105/86 and CCL105/95, patents have been issued for various uses including "machinery for propelling railway cars", "human powered rail bike", "work apparatus for use on railroads and the like", "bicycle attachment", "monorail dump car system" and "apparatus and method for enabling a two-wheeled vehicle to travel along a railroad track". Each device patented to date lacks key enhancements set forth in this invention. The first is a method of eliminating any interference that may occur along either of the parallel tracks, such interference which would eliminate the ability to maintain a secure guidance for the transportation devices. A plurality of interference elimination devices which act independently or simultaneously on railroad tracks to eliminate interference with the tracking wheels, either manually by using a pedal or automatically by overcoming downward pressure on the tracking wheel as it encounters the interference. The second is the ability to steer properly when two duplicate personal transportation devices or the transportation device and another device, when such devices are connected by specific elements to provide three stable planes of alignment, are removed from the parallel tracks but remain connected together.

The third is a plurality of assemblies, which when removed, will allow independent manual adjustment of front steering using a steering mechanism when the transportation devices are not on standard gauge railroad tracks.

Human powered vehicles driven by hand levers, crank wheels, or crank wheels and chains or gears are generally depicted in the various inventions. The inventions do not teach a method of removal of an interference at the track level, such interferences consisting of but not limited to track switches, spikes, sand, gravel, small tree stumps or other biological items that are found alongside or on the track and interfere with the continuous alignment of the transportation devices such that they stay securely on the parallel tracks. What is also not taught to date is a specific method of addressing structural planes of stability between two identical transportation devices or the transportation device and another device. Although various inventions have duality of devices, they do not teach specific planar stability for horizontal, vertical and axial alignment of identical transportation devices or the transportation device and another device. A third item not taught to date is steering methodology for off track steering of dual identical transportation devices or the transportation device and another device that allows proper manual adjustment of the turning radius of the front steering when an assembly is removed and the transportation devices remain connected in such manner as to allow planar stability. Planar stability, in combination with interference removal, is critical for the safety of the riders and stability of any accompanying person or equipment being transported on parallel tracks. Off track steering of the dual identical transportation devices or the transportation device and another device is required when the tandem rider is used on a surface other than parallel tracks. The enhancement in this invention is that the steering can be made accessible when off tracks by removing the interference elimination devices as an assembly.

BACKGROUND OF THE INVENTION

Field of Invention

The present invention relates to a device and method of use thereof for the connection of duplicate transportation devices or the transportation device and another device adapted for use on standard gauge railroad tracks in the United States, or other similar parallel tracks.

SUMMARY OF THE INVENTION

One aspect of the present invention, a tandem unit consisting of two identical personal transportation devices, or the transportation device and another device, configured to transport individuals and/or other items along standard United States railroad gauge tracks has an interference elimination device that allows a plurality of tracking wheels to automatically or manually overcome objects that may prevent the tracking wheel from maintaining alignment with the railroad tracks. These interference elimination devices would independently elevate over interferences on or along the railroad tracks, either by depressing a foot pedal or by overcoming downward pressure maintained on the tracking wheel. Two duplicate personal transportation devices or the transportation device and another device are connected using structural stability elements to provide three stable planes of alignment in vertical, horizontal and axial planes.

A second aspect of the present invention, a tandem unit embodiment consisting of a transportation device and another device configured to transport one individual and small amount of other items along standard United States railroad gauge tracks: A personal transportation device and another device connected using structural stability elements to provide three stable planes of alignment has a steering mechanism capable of providing the front steering elements of the tandem unit embodiment the ability to provide manual adjustment to the turning arc independently when the tandem unit being ridden is still connected for planar stability, but is not being used on parallel tracks, ensuring that when cornering, the inner front wheel, which has to travel in a tighter arc radius than the outer front wheel, which tighter arc pertains to the inner wheel for a turn in either direction by the tandem unit embodiment.

A third aspect of the present invention, a tandem unit consisting of two personal transportation devices and a third device configured to carry another individual or private property has a plurality of assemblies that, when removed as an assembly allow engagement of said steering mechanism for use when the tandem unit embodiment is not being ridden on parallel tracks.

A BRIEF DESCRIPTION OF THE DRAWINGS

The features of the present invention will be best understood from a detailed description of the invention and the devices, embodiments and elements thereof selected for the purpose of illustration and shown in the accompanying drawings in which.

DETAILED DESCRIPTION OF THE INVENTION

Although certain devices, embodiments and elements of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc. . . . , and are disclosed simply as an example of an embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Figure 1:
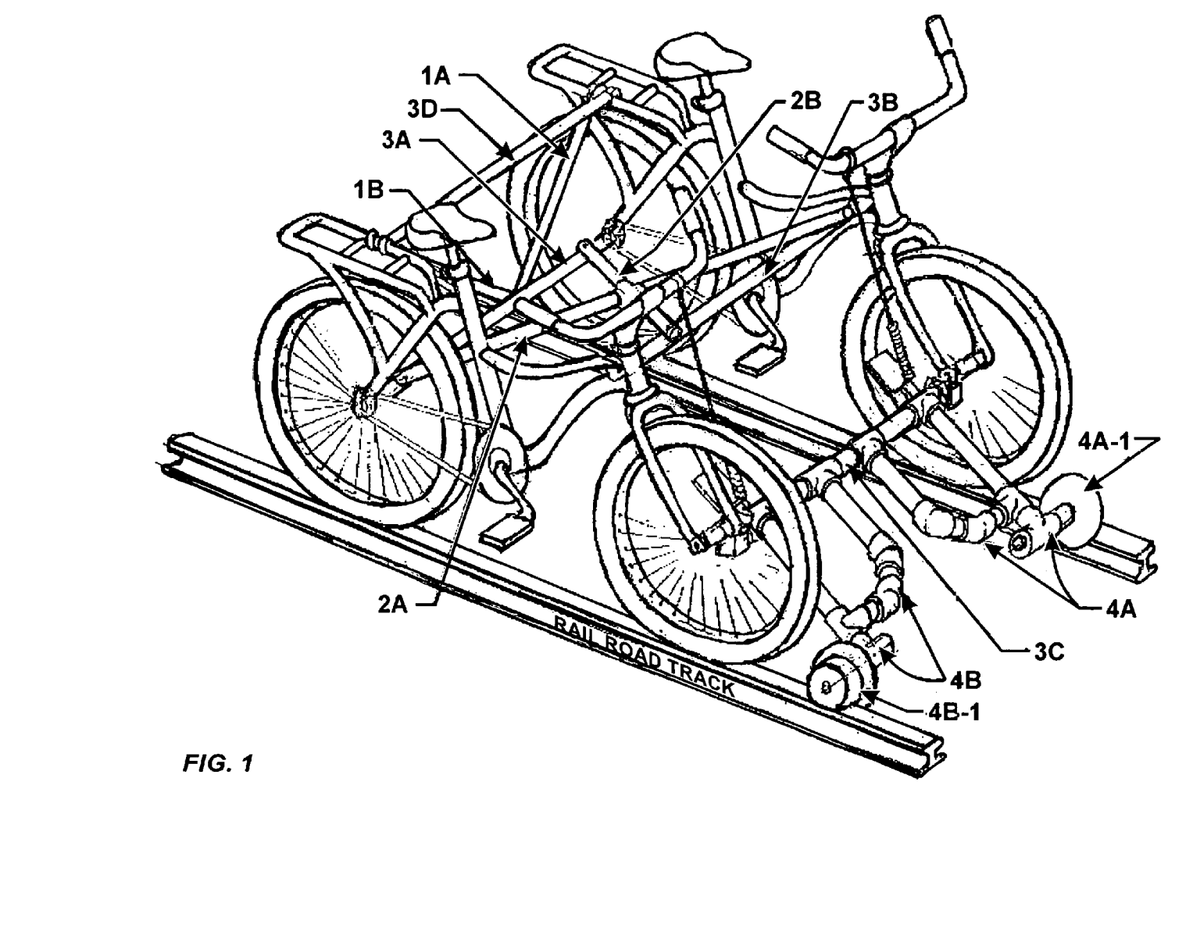
FIG. 1 depicts an isometric view of the embodiment of the tandem rail rider in accordance with the present invention.

FIG. 1 depicts an isometric view of the device 1 for an embodiment of a tandem rail rider by connecting two identical personal transportation devices, or a transportation device and another device, using device 1 in accordance with the present invention. The device 1 comprises: structural elements 1A, 1B, 2A, 2B, 3A, 3B, 3C, 3D and interference elimination devices 4A and 4B, including track guide 4A-1 and 4B-1.

Figure 2:
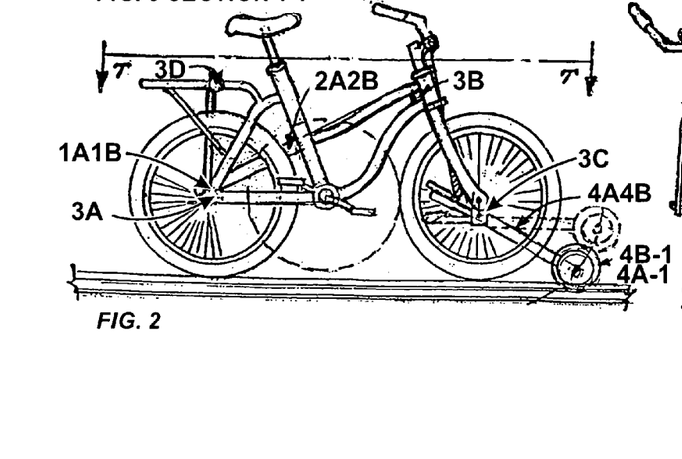
FIG. 2 depicts a side view of the embodiment, with section T-T.

FIG. 2 depicts a side view of the device 1 with the same said elements as depicted in FIG. 1.

Figure 3:
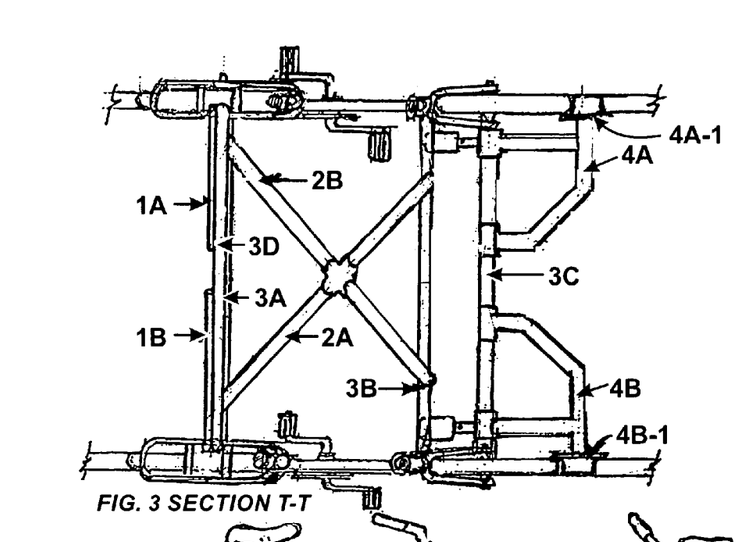
FIG. 3 depicts a top view of the embodiment at section T-T.

FIG. 3 depicts a top view of the device 1 and section T-T with the same said elements as depicted in FIG. 1 and FIG. 2.

Figure 4:
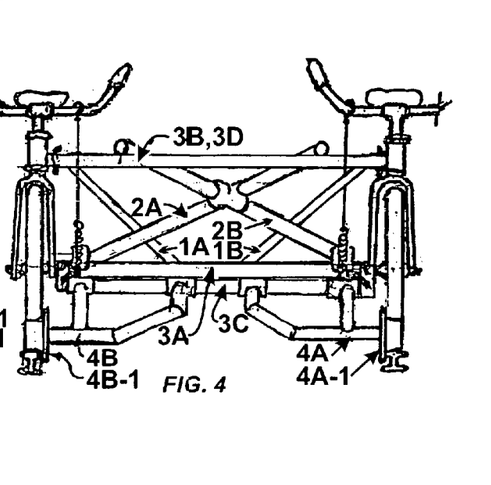
FIG. 4 depicts a front view of the embodiment of the tandem rail rider in accordance with the present invention.

FIG. 4 depicts an end view of the device 1 with the same said elements as depicted in FIG. 1, FIG. 2 and FIG. 3.

Figure 5:
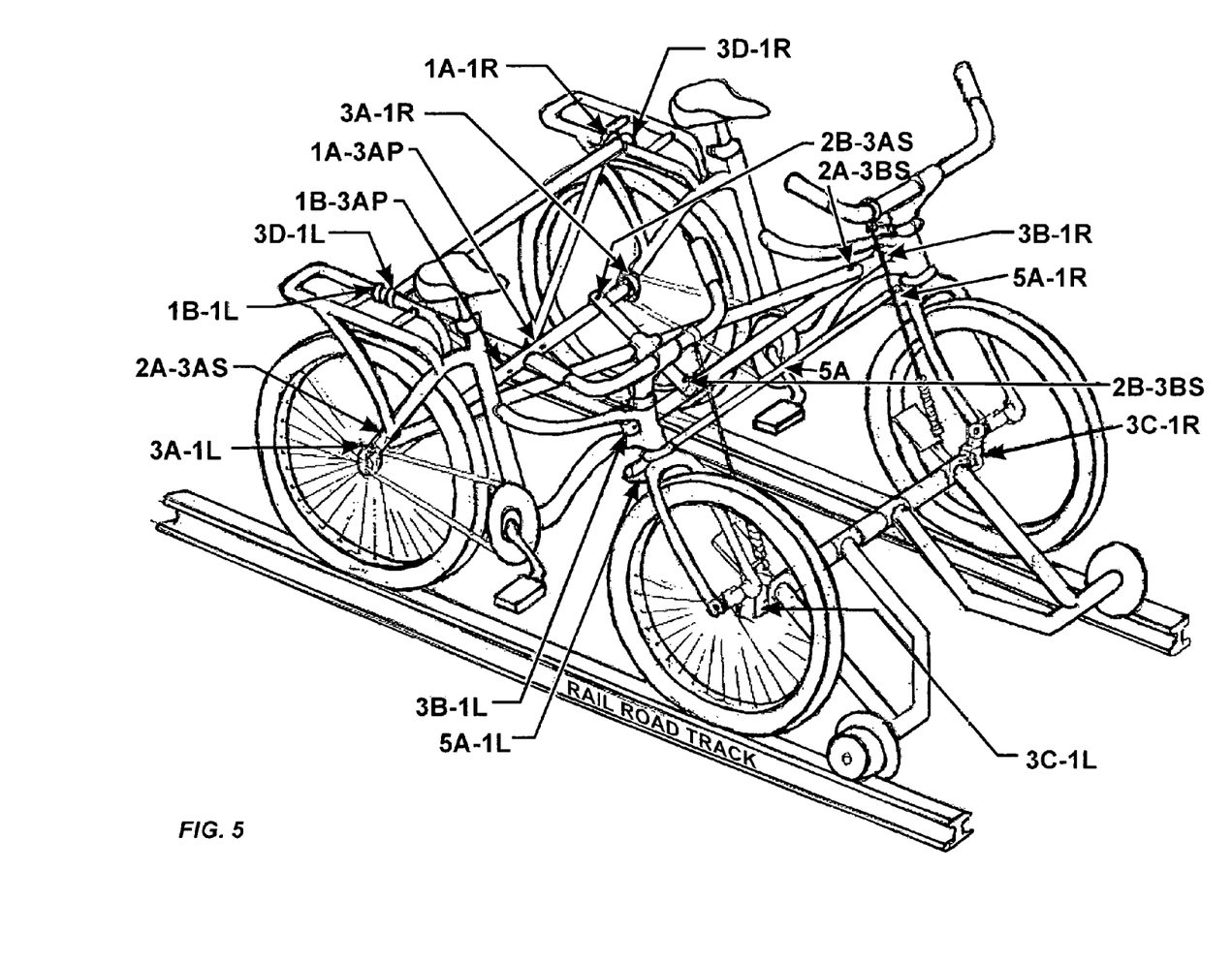
FIG. 5 depicts an isometric view with additional connection points identifying further details of connection of the structural elements for stability and a steering mechanism.

FIG. 5 depicts an isometric view of the device 1 detailing the connection points of device 1: 1A-1R, 1B-1L, 3A-1R, 3A-1L, 3D-1R, 3D-1L, 3B-1R, 3B-1L, 3C-1R, 3C-1L, 5A-1R and 5A-1L. The device 1 also comprises steering mechanism 5A, including attachment points 5A-1R and 5A-1L, in accordance with the present invention.

Figure 6:
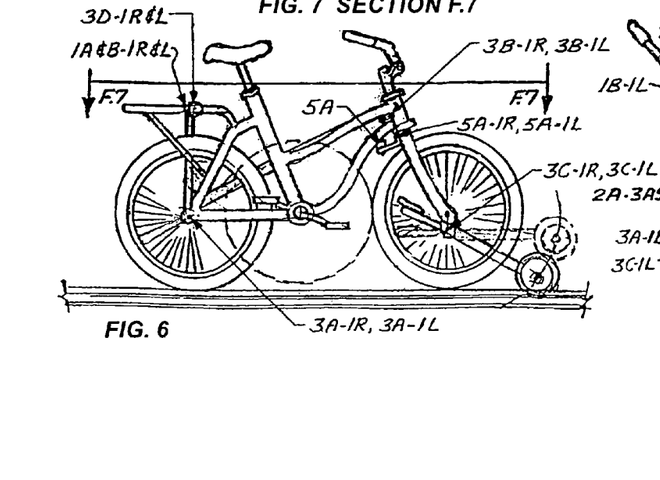
FIG. 6 depicts a side view, with section F.7, with additional detail component numbers identifying further details of connection of the structural elements for stability.

FIG. 6 depicts a side view of the device 1 with the same said connection points as depicted in FIG. 5.

Figure 7:
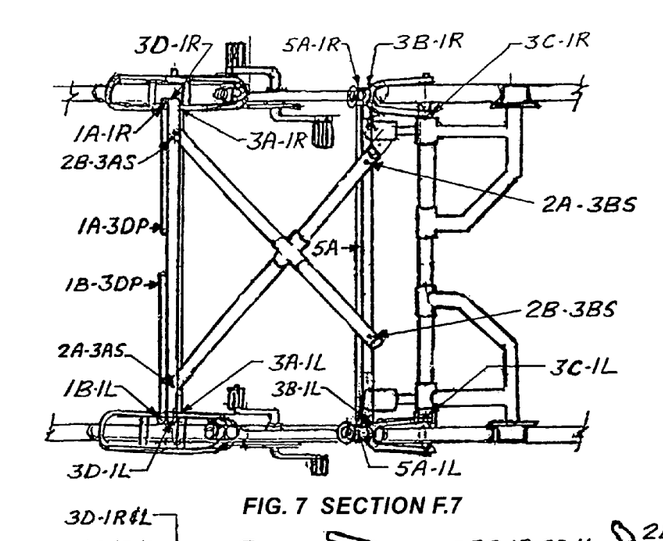
FIG. 7 depicts a top view at section F.7 with additional detail component numbers identifying further details of connection of the structural elements for stability.

FIG. 7 depicts a top view of the device 1, section F.7-F.7 with the same said connection points as depicted in FIG. 5 and FIG. 6.

Figure 8:
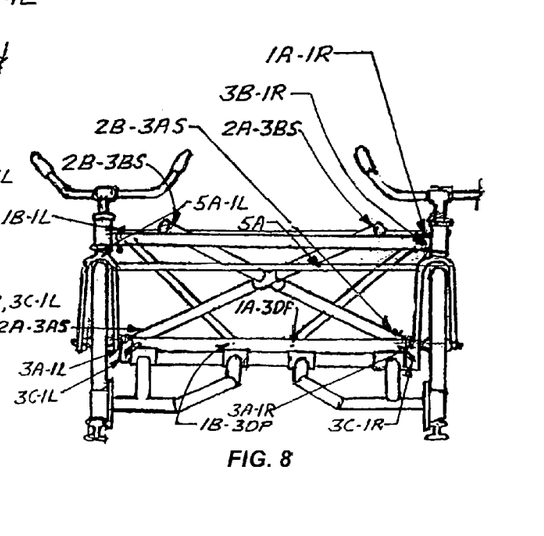
FIG. 8 depicts a front view of an embodiment of the tandem rider in accordance with the present invention with additional detail component numbers identifying further details of connection of the structural elements for stability.

FIG. 8 depicts an end view of the device 1 with the same said connection points as depicted in FIG. 5, FIG. 6 and FIG. 7.

Figure 9:
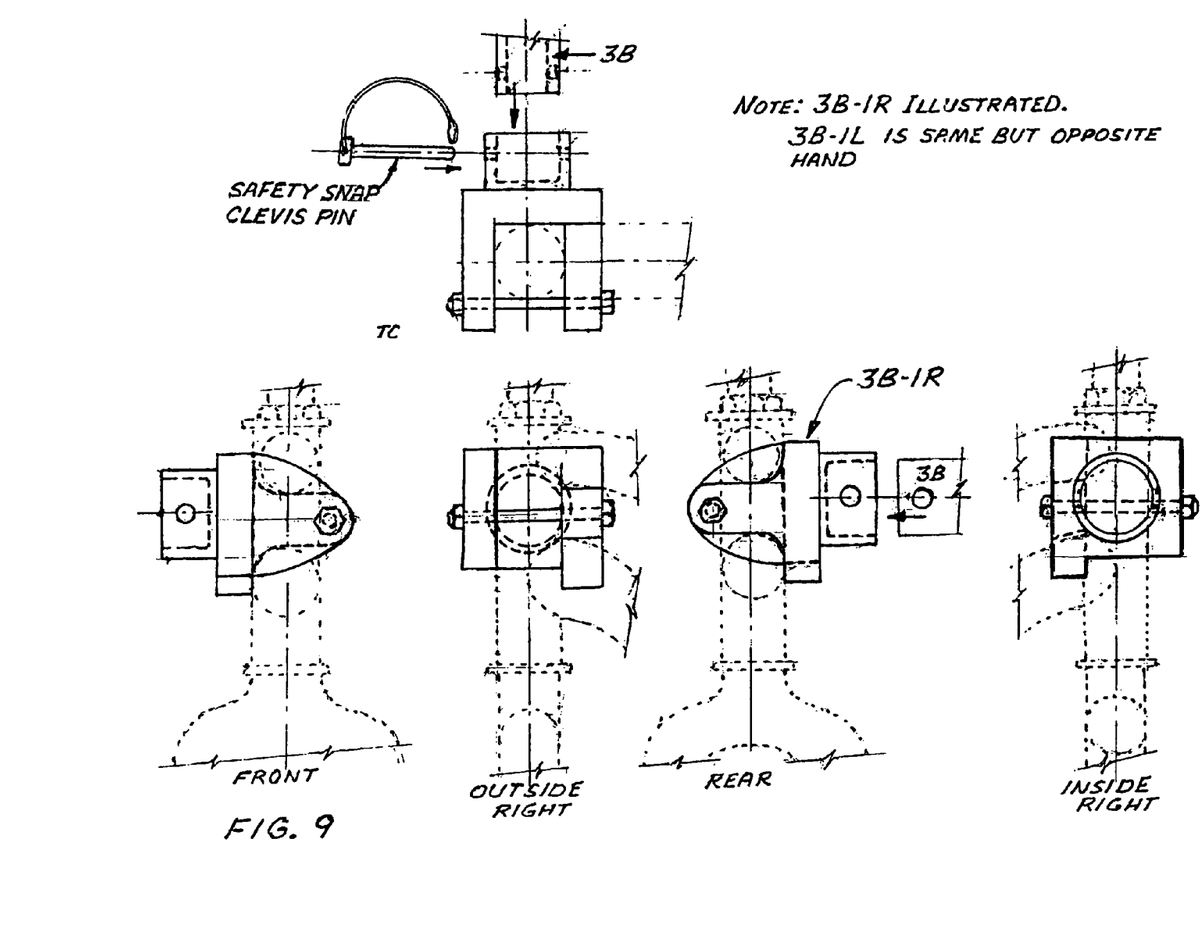
FIG. 9 depicts five views, front, outside right, rear, inside right and top, of structural element connection point 3B-1R (3B-1L same but opposite hand).

FIG. 9 depicts details of connection point 3B-1R, (3B-1L same but opposite hand). Structural element 3B is attached to the duplicate transportation device or the transportation device and another device using a safety snap clevis pin, or other similar quick release device, penetrating 3B-1R and 3B-1L and said element 3B such that the structural element 3B can be quickly disconnected from the attachment point of said transportation device or another device. Connection points 3B-1R and 3B-1L are configured in such manner as to surround the duplicate transportation device or the transportation device and another device. Said configuration may be identical or different depending on the devices being attached.

Figure 10:
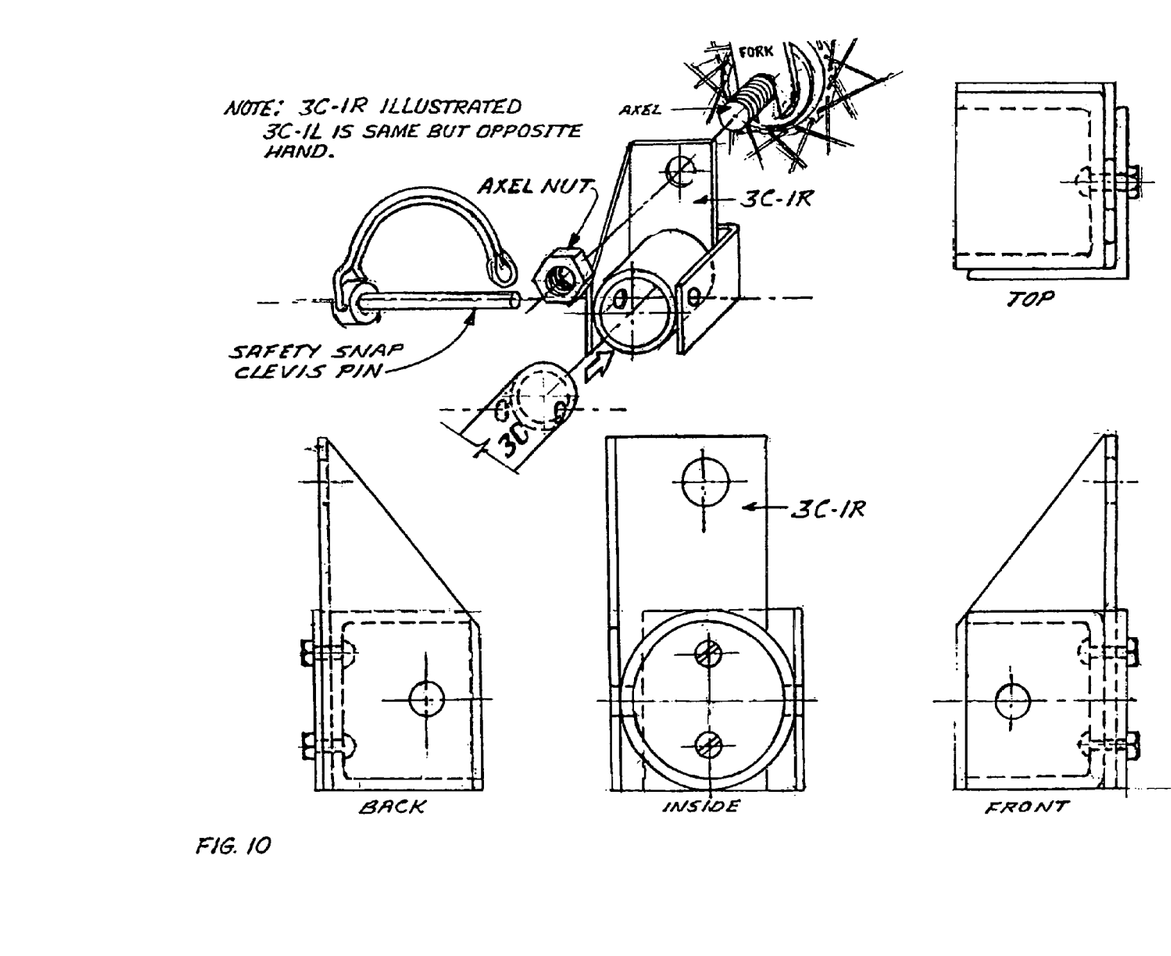
FIG. 10 depicts five views, back, inside, front, top and oblique exploded view, of structural element connection point 3C-1R (3C-1L same but opposite hand).

FIG. 10 depicts details of connection point 3C-1R (3C-1L same but same but opposite hand). Structural element 3C is attached to the duplicate transportation device or the transportation device and another device using a safety snap clevis pin, or other similar quick release device, penetrating 3C-1R and 3C-1L and said element 3C such that the structural element 3C can be quickly disconnected from the attachment point of said transportation device or another device. Connection points 3C-1R and 3C-1L are configured in such manner as to attach to the duplicate transportation device or the transportation device and another device using the depicted axle nut. Said configuration may be identical or different depending on the devices being attached.

Figure 11:
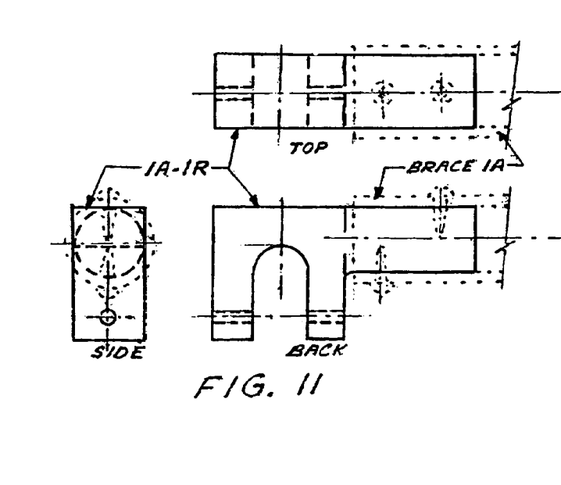
FIG. 11 depicts three views, side, back and top, of structural element connection point 1A-1R (structural element brace 1A) (1B-1L same but opposite hand).

FIG. 11 depicts details of connection point 1A-1R (1B-1L same but opposite hand). Connection point 1A-1R and 1B-1L are connected with a hair pin cotter pin or similar device to structural element 1A and 1B such that said stability element 1A and 1B can be quickly disconnected from the attachment point of said transportation device or another device. Said configuration may be identical or different depending on the devices being attached.

Figure 12:
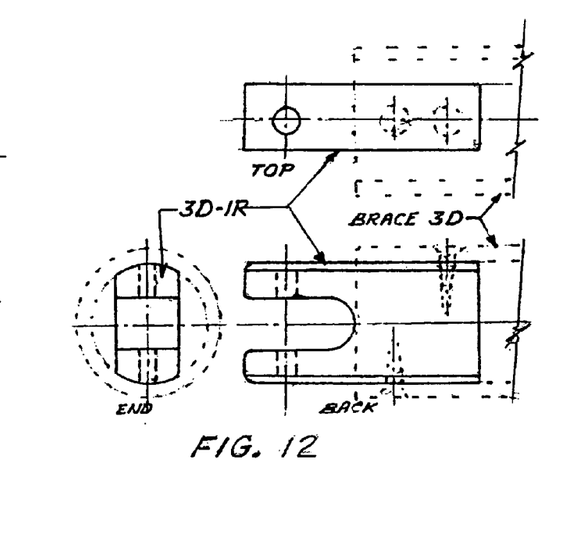
FIG. 12 depicts three views, end, back and top, of structural element connection point 3D-1R (structural element brace 3D) (3D-1L same but opposite hand).

FIG. 12 depicts details of connection point 3D-1R (3D-1L same but opposite hand). Connection point 3D-1R and 3D-1L are connected with a safety snap clevis pin or similar device to structural stability element 3D such that said structural element 3D can be quickly disconnected from the attachment point of said transportation device or another device. Said configuration may be identical or different depending on the devices being attached.

Figure 13:
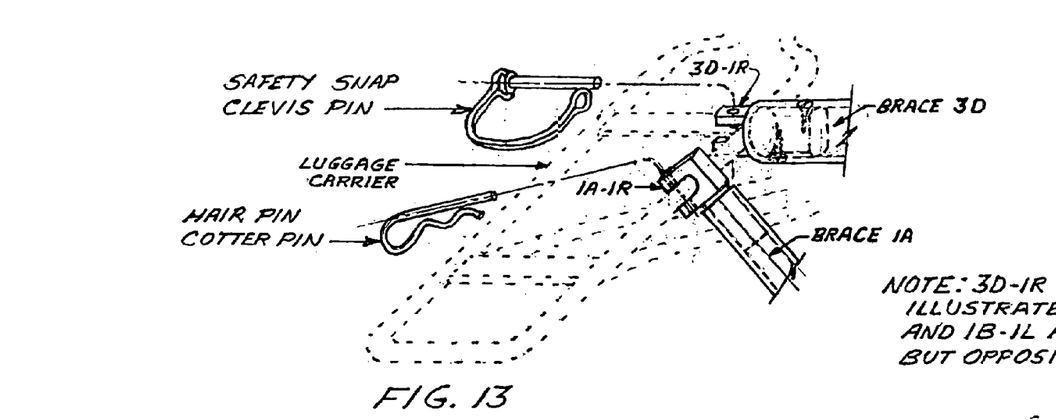
FIG. 13 depicts an oblique exploded view of the 1A-1R and 3D-1R connection points (brace 1A and brace 3D) (1B-1L and 3D-1L same but opposite hand).

FIG. 13 depicts an oblique exploded view of connection points 1A-1R and 3D-1R (3D-1L and 1B-1L same but opposite hand).

Figure 14:
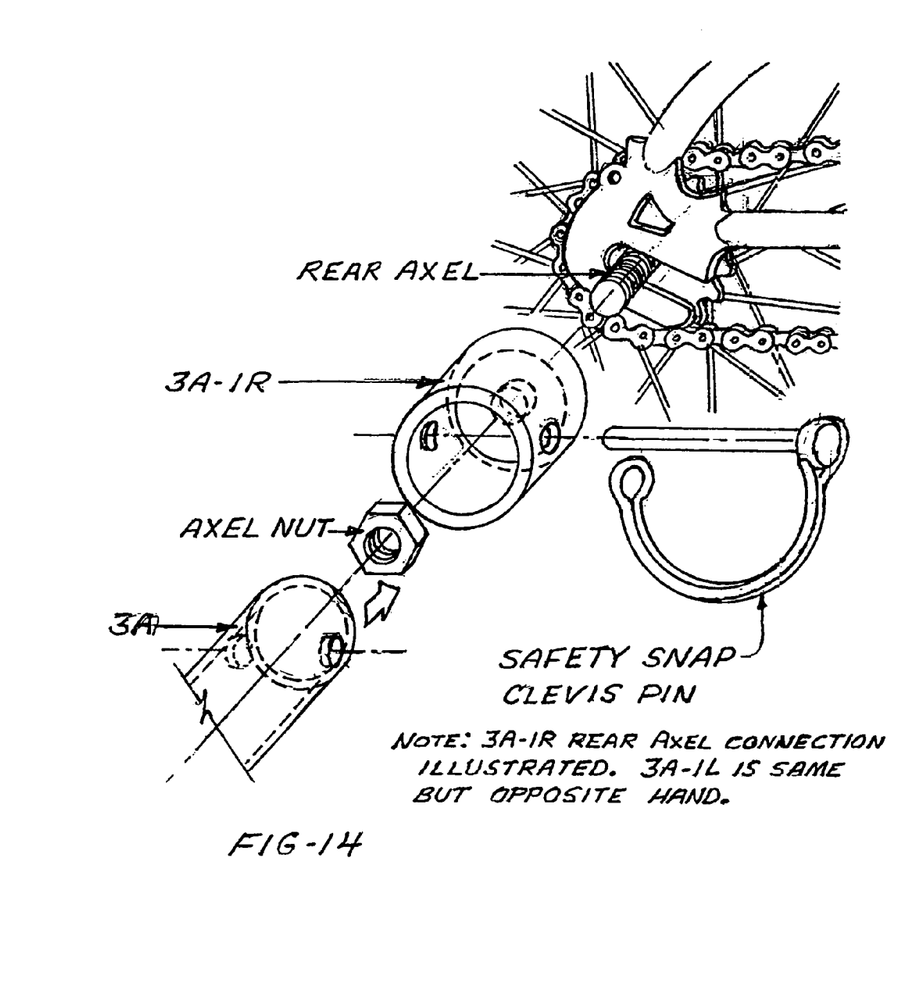
FIG. 14 depicts an oblique exploded view of 3A structural element connection point at 3A-1R (3A-1L same but opposite hand).

FIG. 14 depicts an oblique exploded view of connection point 3A-1R (3A-1L same but opposite hand). Structural element 3A is attached to the duplicate transportation device or the transportation device and another device using a safety snap clevis pin, or other similar quick release device, penetrating 3A-1R and 3A-1L and said element 3A such that the structural element 3A can be quickly disconnected from the attachment point of said transportation device or another device. Connection points 3A-1R and 3A-1L are configured in such manner as to attach to the duplicate transportation device or the transportation device and another device using the depicted axle nut. Said configuration may be identical or different depending on the devices being attached.

Figure 15:
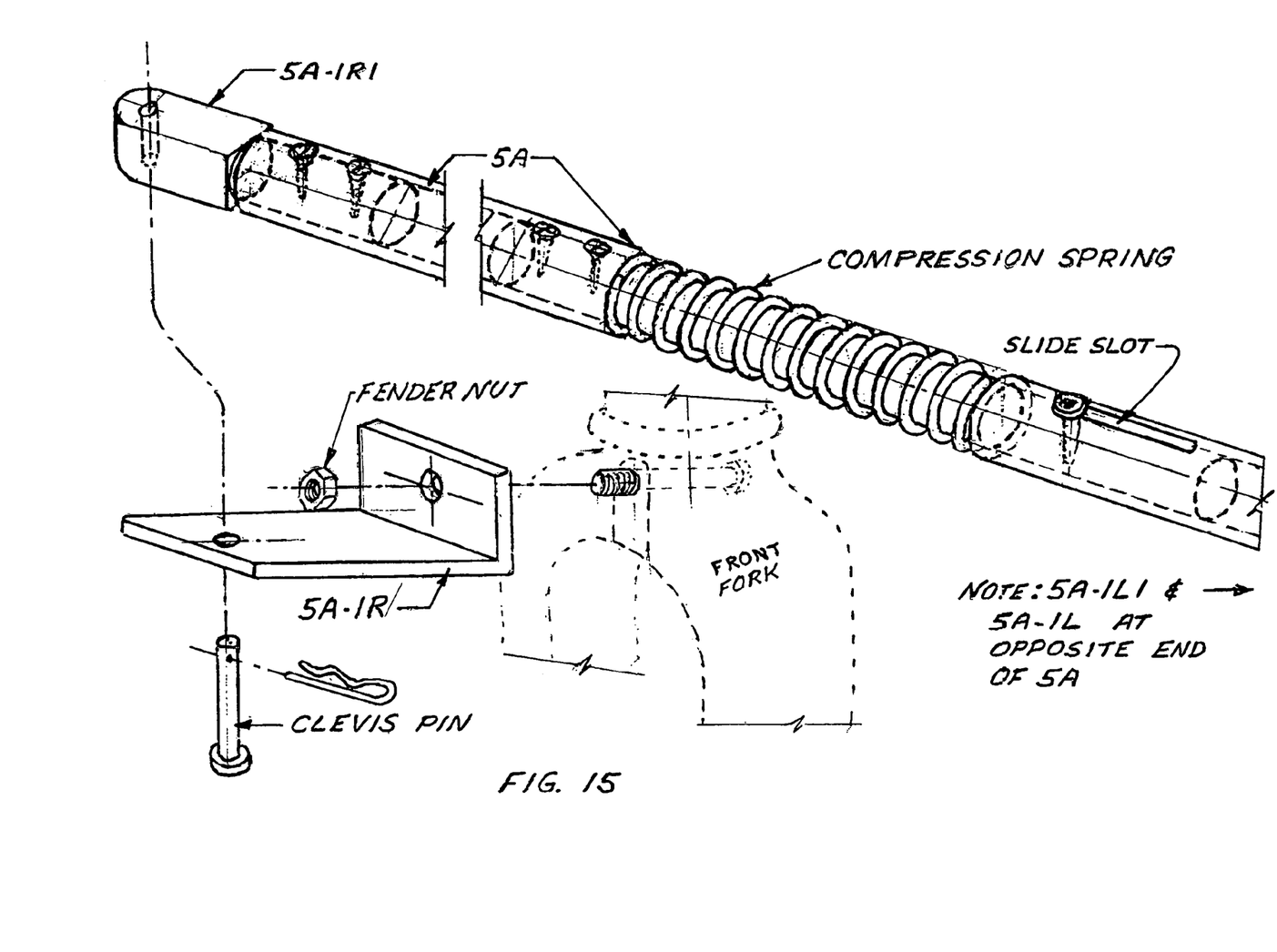
FIG. 15 depicts an isometric exploded cutoff view of track steering mechanism 5A and the connection point of 5A-1R1 to 5A-1R (5A-1L1 and 5A-1L are same but opposite end of 5A).

FIG. 15 depicts an isometric cut off exploded view of connection point 5A-1R1 and 5A-1R (connection points 5A-1L1 and 5A-1L same but at opposite end of 5A) of the steering mechanism 5A. Connection point 5A-1R and point 5A-1L are connected to the front steering frame of the duplicate transportation devices or the transportation device and another device with a bolt and nut through the rotating fork of the duplicate transportation devices or the transportation device and another device's steering assembly. 5A-1R1 and 5A-1L1 is connected to connection point 5A-1R and 5A-1L respectively utilizing a clevis pin and hair pin cotter pin or other equivalent device such that said steering mechanism 5A can be quickly disconnected from the attachment point 5A-1R and 5A-1L of said duplicate transportation devices or transportation device and another device.

Figures 16, 17:
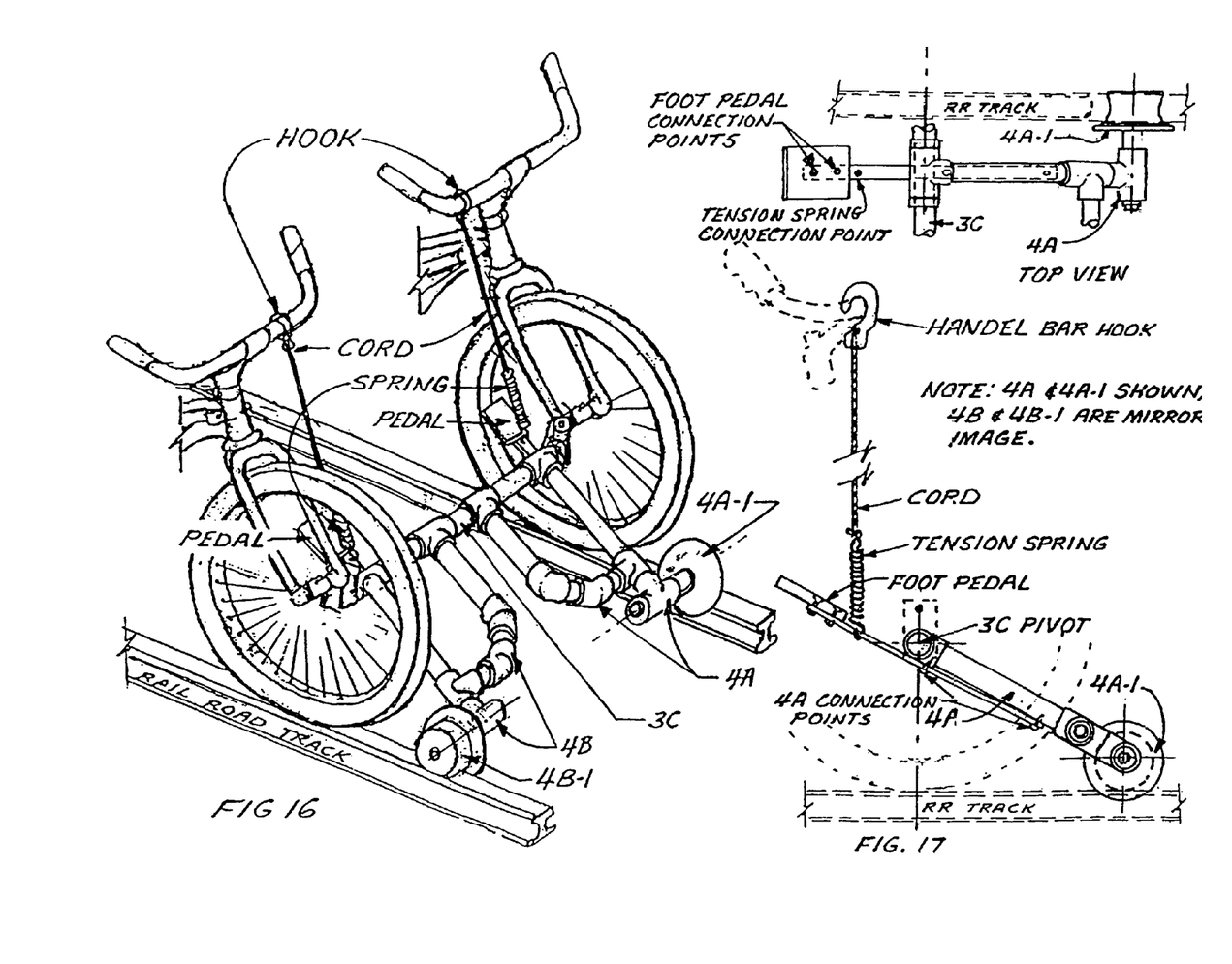
FIG. 16 depicts an isometric view of the front section of said device 1 with specific details of the pressure maintenance device and identification of the parts related thereto.
FIG. 17 depicts the right front side view of the pressure maintenance device in the down position on the track. Also depicted is the top view of the same.
Figures 18, 19:
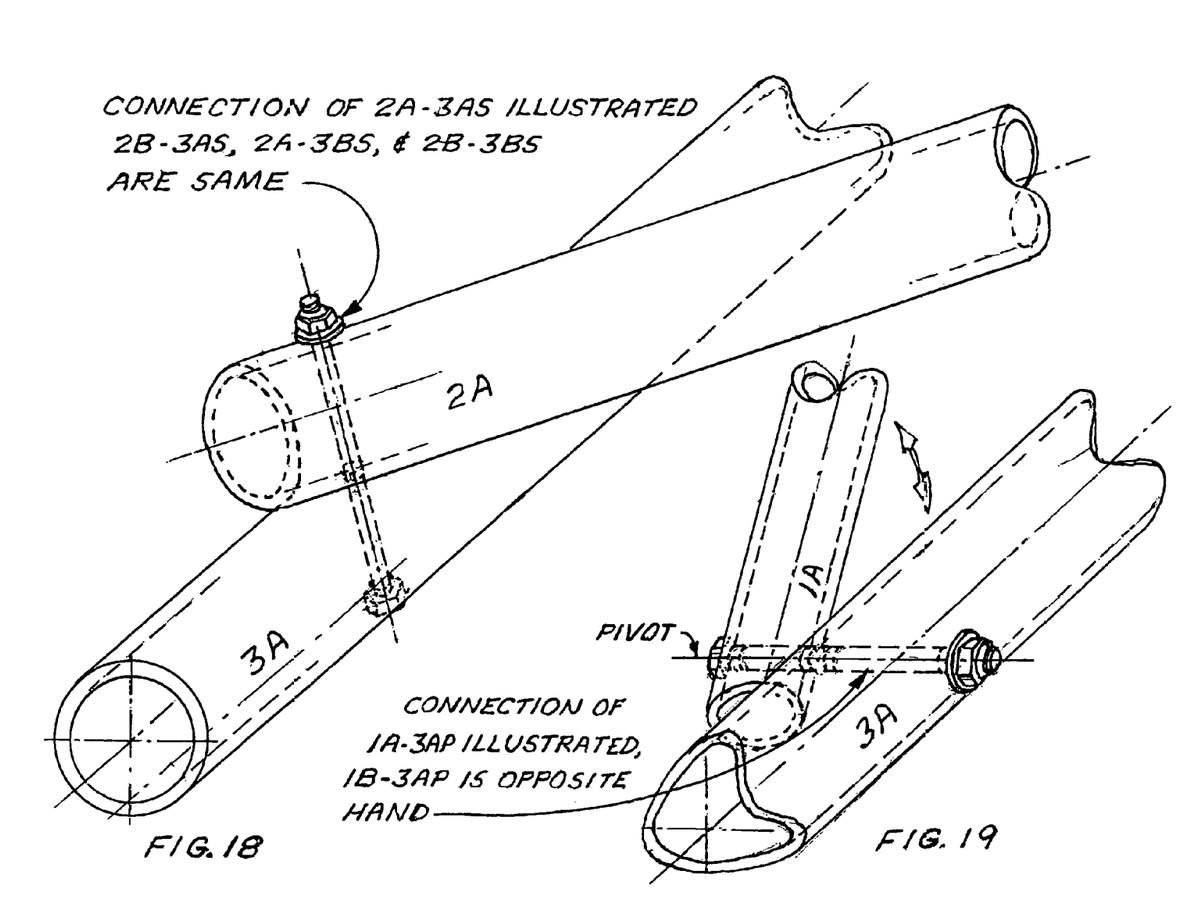
FIG. 18 depicts an oblique view of the solid connections of said structural element connection points 2A-3AS, 2B-3AS, 2A-3BS and 2B-3BS.
FIG. 19 depicts an oblique view of pivotal connections of the said structural element connection points 1A-3AP, (1B-3AP same but opposite hand).
Figure 20:
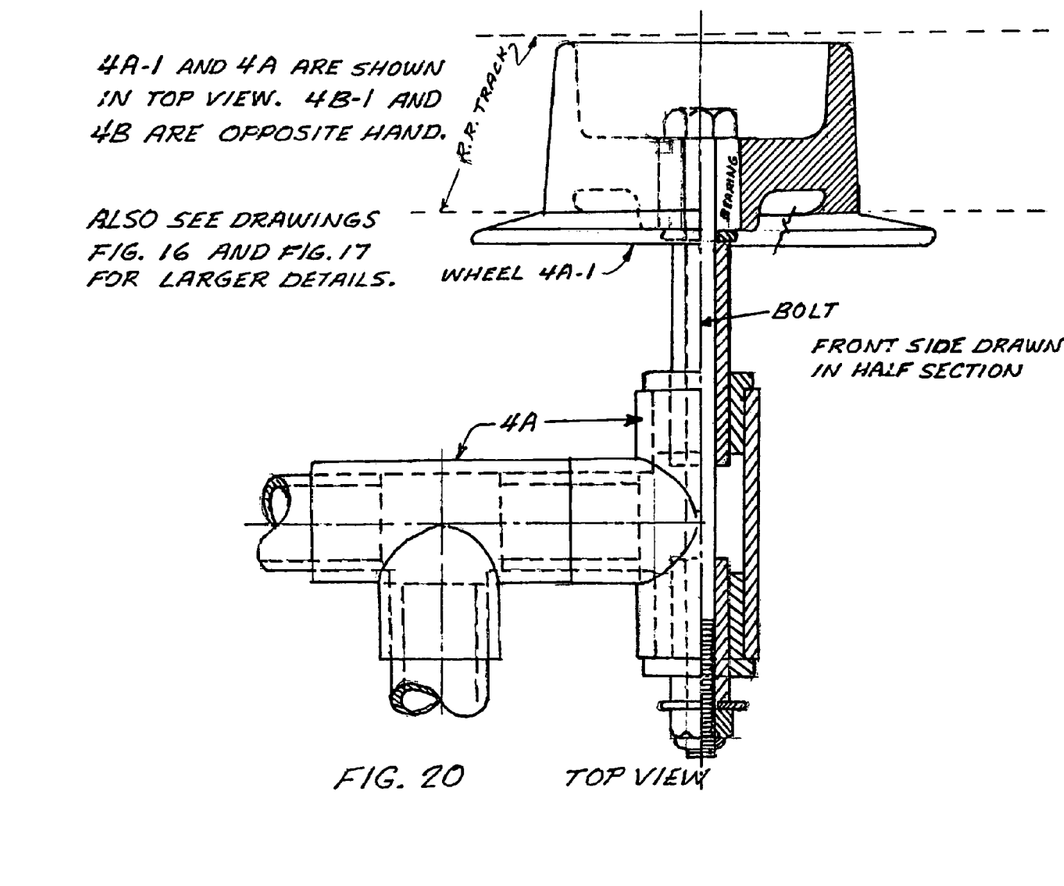
FIG. 20 depicts a top cutaway view of a method of attachment of tracking wheel 4A-1 to device 4A and 4B-1 to 4B (same but opposite hand).

Referring to FIG. 1 through FIG. 20 the planar structural elements 1A, 1B, 2A, 2B, 3A, 3B, 3C and 3D shown in FIG. 1 connect the identical transportation devices at points 1A-1R, 1B-1L, 3A-1R, 3A-1L, 3D-1R, 3D-1L, 3B-1R, 3B-1L, 3C-1R and 3C-1L shown in FIG. 5. FIG. 5 also depicts steering mechanism 5A including connection points 5A-1R1 and 5A-1L1, including said connecting points 5A-1R1, 5A-1R and 5A-1L1 and 5A-1L (shown in FIG. 15). The structural elements 1A, 1B, 2A, 2B, 3A, 3B, 3C and 3D provide flat plane structural support preventing the duplicate transportation devices or the transportation device and another device from becoming misaligned in the vertical, axial and horizontal planes at the front, rear and top of the duplicate transportation devices or the transportation device and another device so connected in accordance with the present invention. Interference elimination devices 4A and 4B are connected to 3C in a manner surrounding 3C. Surrounding as used herein is defined as extending or partially extending on all sides of the element 3C simultaneously, i.e., encircle; enclosing or confining, or partially enclosing or partially confining an all sides so as to secure the devices 4A and 4B around element 3C at four connection points, which points are separated so as to provide independent anti-rotational motion of either connecting points for devices 4A and 4B relative to element 3C. Interference elimination devices 4A and 4B are connected to said element 3C between the duplicate transportation devices or the transportation device and another device in a manner that provides positive downward pressure at all times on devices 4A and 4B such that the each individual device's rotating tracking wheel remains in constant contact with the track the duplicate transportation device or the transportation device and another device are being conveyed upon. The connection point of the pressure maintenance device at high point of the connection will be easily removable, such as the handle bar hook as shown in FIG. 16 and FIG. 17 or bow knot from a shoe string or a quick release device of any configuration that allows rapid release of each high point connection. FIG. 17 depicts the connection point of the pressure maintenance device at low point of the connection. The tension spring connection point will be located on the pedal end of devices 4A and 4B such that the connection and pressure is continuously maintained at the low point, when the high point handle bar hook is engaged on the handle bar. The low point connection is configured with a foot pedal attached at the foot pedal connection points to allow independent manual activation of either device 4A or 4B near the tension spring connection to device 4A and 4B. Said tracking wheels 4A-1 and 4B-1 are connected to said devices 4A and 4B by a bolt, nut and washer through said tracking wheel and said devices 4A and 4B as depicted in FIG. 20. Said steering mechanism 5A is connected to the duplicate transportation devices or the transportation device and another device as shown in FIG. 15. Steering mechanism 5A is connected at the right end to element 5A-1R1 and to the left end at element 5A-1L1. On the right end element 5A-1R1 is connected to element 5A-1R which is in turn connected to the steering mechanism of the right duplicate transportation device or another device. On the left end element 5A-1L1 is connected to element 5A-1L which is in turn connected to the steering mechanism of the left duplicate transportation device or another device. When two safety snap clevis pins are removed from 3C-1R and 3C-1L respectively (See FIG. 10 Exploded isometric view) the entire assembly consisting of 3C, 4A, 4B, 4A-1, 4B-1, tension springs, cords and handle bar hooks and foot pedals, may be removed as a complete subassembly (See FIG. 16 and FIG. 17) thus allowing steering of the duplicate transportation devices or transportation device and another device, when the tandem rider is removed from parallel tracks and placed on another appropriate surface. This complete subassembly when removed, can conveniently hang on the rear luggage carriers of the duplicate transportation devices, while in use off the parallel tracks.

The alignment devices, interference elimination devices and steering mechanism are typically constructed of materials including but not limited to steel, aluminum, iron, ceramic composites, polymer composites, nano-polymer composites, alloys of the aforementioned, and combinations thereof. The construction materials, as previously mentioned, for the structural elements and interference elimination devices are not meant to limit the scope of the materials that may be used in an embodiment of the present invention. Any material having physical and chemical properties to withstand stress conditions typically generated while operating the tandem rider embodiment can be used thereof in accordance with the present invention.

Typically, an area of connection at the ends for said structural elements are removably attached to the duplicate transportation devices or the transportation device and another device. The means of removable attachment include but are not limited to a clevis pin, hair pin cotter pin, safety snap clevis pin, hinge, a snap-fit bolt and lock, a screw-in bolt and lock, a sliding bolt and lock, or any combination thereof, or a quick release clip, clamp or other similar mechanism that allows disassembly of the said device 1 connecting the two duplicate transportation devices or the transportation device and another device.

Typically, the interference removal devices 4A and 4B can be configured easily to remove all pressure and the devices folded up to a travel position near vertical, approximately one quarter revolution from the functional pressure maintenance position.

In an assembled condition the devices 4A and 4B connect to element 3C and allow travel along parallel tracks, avoiding any interference at either track with either independent tracking wheel by relieving a portion of the pressure maintained by either tracking wheel 4A-1 or 4B-1 on the parallel tracks. The pressure may be relieved by the pressure maintenance device automatically, or by manual activation of either device 4A or 4B utilizing the foot pedal depicted in FIG. 17. The devices 4A and 4B surround element 3C which is connected to the two duplicate transportation devices, or the transportation device and another device, with quick release pins at connection point 3C-1R and 3C-1L, thus allowing removal of said element 3C allowing the devices 4A and 4B no longer be connected and the devices 4A and 4B including tracking wheels 4A-1 and 4B-1 may be transported as assemblies in a smaller space than when in the connected configuration.

Said embodiments, elements and devices of a said device 1 may be used to connect various types of transportation devices including, but not limited to, bicycles, motorcycles, carts, containers, or other any other devices that may be configured to travel on parallel tracks while being connected by said device 1 in accordance with the present invention.

While said device 1 is shown with manual type connections, those in the art should recognize that other devices or implements may be included in the connection device embodiment to assist, enhance, control or otherwise modify the connection of two duplicate transportation devices or the transportation device and another device that may travel on parallel tracks. Moreover, the connection points that allow removable attachment to the two duplicate transportation devices or the transportation device and another device may be manually or electrically operable. Furthermore a hydraulic pump-assist activation mechanism may be included to help install or remove any number of the connecting points.

While this invention has been described in conjunction with the specific devices, embodiments and connection points outlined above, it is evident that many alternatives, modification and variations will be apparent to those skilled in the art. Accordingly, the devices, embodiments and connection points of the invention as set forth above are intended to be illustrative, not limiting. Various changes may be made without departing from the spirit and scope of the invention. Thus, the foregoing description of the devices, embodiments and connection points of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A tandem rail rider for traveling on and off of railroad tracks comprising:
   a pair of duplicate transportation devices connected together, each having two wheels and configured for travel both on and off of railroad tracks while connected together;
   a plurality of removable planar structural elements, wherein the planar structural elements connect the duplicate transportation devices together and act to prevent the pair of duplicate transportation devices from becoming misaligned by providing vertical, horizontal and axial stability;
   a pair of interference elimination devices, each including a tracking wheel, a lever and a pedal and connected to each other and the pair of duplicate transportation devices by one of the plurality of structural elements so as to locate the interference elimination elements between the pair of duplicate transportation devices, wherein the pair of interference elimination devices are configured to freely rotate independently of each other about the one of the plurality of structural elements, and wherein each pedal is configured to be manipulated by a rider of a respective one of the pair of duplicate transportation devices so as to selectively raise the tracking wheel off of a respective railroad track to avoid interferences located on or next to the track.

2. The tandem rail rider of claim 1, wherein each duplicate transportation device further comprises a pressure maintenance device including a tension spring, a cord and a hook; each of said pressure maintenance devices is connected between a high point and a low point on the respective duplicate transportation device.

3. The tandem rail rider of claim 2, wherein each pressure maintenance device maintains constant pressure in a downward direction on said tracking wheel.

4. The tandem rail rider of claim 2, wherein each pressure maintenance device is attached to a respective interference elimination device in a manner allowing said free rotation of the elimination device about multiple pivot points on said one of the plurality of structural elements and is attached to said lever at said low point.

5. The tandem rail rider of claim 2, wherein each pressure maintenance device is attached to a respective interference elimination device in a manner allowing said free rotation of the elimination device about multiple pivot points on said one of the plurality of structural elements and is attached at said hook to said high point.

6. The tandem rail rider of claim 1, wherein each of said interference elimination elements is configured to freely rotate about multiple pivot points on said one of the plurality of structural elements.

7. The tandem rail rider of claim 1, further comprising a steering mechanism for use during off track travel comprising a first and a second end connection element, each of said end connection elements having an aperture for connecting to a respective one of the pair of duplicate transportation devices at a rotating point which allows steering both transportation devices; said first end connection device having a solid end that accepts and affixes a first end of a first hollow tie rod, which first hollow tie rod has a second end that accepts and affixes a first end of a solid rod having a compression spring around said solid rod; said solid rod is further accepted at a second end by a second hollow tie rod, said second hollow tie rod including a slide slot configured to allow movement of said second end of said solid rod internally to said second hollow tie rod; and wherein said second hollow tie rod is accepted on a solid end of said second end connection element.

8. The tandem rail rider of claim 7, wherein said pair of interference elimination elements and said one of the plurality of structural elements to which they are attached are removable as an assembly from between the transportation device, such removal allowing independent manual adjustment of the front steering using said steering mechanism.

9. A tandem rail rider for traveling on and off of railroad tracks comprising:
- a pair of duplicate transportation devices connected together, each having two wheels and configured for travel both on and off of railroad tracks while connected together;
- a plurality of removable planar structural elements, wherein the planar structural elements connect the duplicate transportation devices together and act to prevent the pair of duplicate transportation devices from becoming misaligned by providing vertical, horizontal and axial stability;
- a steering mechanism for use during off track travel comprising a first and a second end connection element, each of said end connection elements having an aperture for connecting to a respective one of the pair of duplicate transportation devices at a rotating point which allows steering both transportation devices; said first end connection device having a solid end that accepts and affixes a first end of a first hollow tie rod, which first hollow tie rod has a second end that accepts and affixes a first end of a solid rod having a compression spring around said solid rod; said solid rod is further accepted at a second end by a second hollow tie rod, said second hollow tie rod including a slide slot configured to allow movement of said second end of said solid rod internally to said second hollow tie rod; and wherein said second hollow tie rod is accepted on a solid end of the second end connection element.

10. The tandem rail rider of claim 9, wherein said slide slot contains a single element configured to allow said solid bar having said compression spring to move axially within said second hollow tie rod, said single element further preventing said solid bar from rotating with respect to said second hollow tie rod.

11. The tandem rail rider of claim 9 further comprising a pair of interference elimination devices, each including a tracking wheel, a lever and a pedal and connected to each other and the pair of duplicate transportation devices by one of the plurality of structural elements so as to locate the interference elimination elements between the pair of duplicate transportation devices, wherein the pair of interference elimination devices are configured to freely rotate independently of each other about the one of the plurality of structural elements, and wherein each pedal is configured to be manipulated by a rider of a respective one of the pair of duplicate transportation devices so as to selectively raise the tracking wheel off of a respective railroad track to avoid interferences located on or next to the track.

12. The tandem rail rider of claim 11, wherein said pair of interference elimination elements and said one of the plurality of structural elements to which they are attached are removable as an assembly from between the transportation device, such removal allowing independent manual adjustment of the front steering using said steering mechanism.

\* \* \* \* \*